United States Patent

Ewing

[15] 3,698,670
[45] Oct. 17, 1972

[54] VERTEBRAL FRACTURE PREVENTION SYSTEM

[72] Inventor: Channing L. Ewing, Pensacola, Fla.

[73] Assignee: The United States of America as represented by the Secretary of the Navy

[22] Filed: Dec. 17, 1970

[21] Appl. No.: 99,197

[52] U.S. Cl........244/122 AG, 280/150 AB, 297/216
[51] Int. Cl. ............................................B64d 25/06
[58] Field of Search.244/122 AG, 122 B, 122 R, 122 AL; 280/150 AB, 150 B; 297/284, 216, DIG. 3

[56] References Cited

UNITED STATES PATENTS

| | | | |
|---|---|---|---|
| 3,202,383 | 8/1965 | Martin | 244/122 AG |
| 3,099,261 | 7/1963 | Doss et al. | 244/122 R X |
| 3,178,136 | 4/1965 | Bayer | 244/122 AG |
| 3,219,297 | 11/1965 | Kenyon | 244/122 B |
| 3,271,797 | 9/1966 | Boyce | 244/122 R X |

Primary Examiner—Milton Buchler
Assistant Examiner—Carl A. Rutledge
Attorney—Richard S. Sciascia, Don D. Doty and William T. Skeer

[57] ABSTRACT

Disclosed herewith is a vertebral fracture prevention system which incorporates motor driven body restraint devices for positioning and holding a person in a safe postural position within a rapidly moving craft immediately prior to his being subjected to +$G_z$ acceleration generated by any means including forceful ejection. Also included is a resilient inflatable bag or other device that is disposed against the back of said person which is inflated or otherwise actuated in such a manner immediately prior to exposure to +$G_z$ acceleration as to cause the thoraco-lumbar region of the spinal column thereof to assume an arcuate posterial curvature due to hyperextension thereat, so as to prevent wedge fractures of the forward edges of the adjacent vertebrae thereof as a result of their being exposed to extreme anterior bending acceleration forces.

20 Claims, 12 Drawing Figures

PATENTED OCT 17 1972 3,698,670

Channing L. Ewing
INVENTOR

By Dax D. Doty
Attorney

Channing L. Ewing
INVENTOR

By Don D. Doty
Attorney

Fig. 9

PATENTED OCT 17 1972 3,698,670

Channing L. Ewing
INVENTOR

By Don D. Doty
Attorney

VERTEBRAL FRACTURE PREVENTION SYSTEM

STATEMENT OF GOVERNMENT INTEREST

The invention described described herein may be manufactured and used by or for the Government of the United States of America for governmental purposes without the payment of any royalties thereon or therefor.

FIELD OF THE INVENTION

The present invention relates generally to safety systems and particularly to systems for physically removing and/or protecting human beings from exceedingly precarious or dangerous emergency situations that otherwise would probably result in the injury or death thereof, if they were not timely and properly protected or extracted therefrom. In even greater particularity, the invention comprises an improved system for positioning the torso of ejecting pilots or other persons subjected to +$G_z$ accelerations generated by disabled or crashing aircraft, underwater craft, or other surface, air or space vehicles in such manner that fracture of their vertebrae or the breaking of their backs do not usually occur.

At the outset, it should perhaps be noteworthy that the invention is primarily intended to be used as a safe pilot ejection system and, accordingly, the preferred embodiments thereof disclosed herein will be described for such purpose, in order to keep this disclosure as simple as possible. However, as will be mentioned again subsequently, it should be understood that it is not intended that the invention be limited to such utility alone, inasmuch as it has numerous other applications of value, the obviousness of which would be readily recognized by the artisan having the benefit of the teachings presented herewith. Hence, the field of this invention should be considered as broad in scope as necessity so warrants.

BACKGROUND OF THE INVENTION

Heretofore, it has been found that during numerous ejections of aviators from jet aircraft a considerable number of their vertebrae were fractured, and, unfortunately, they were fractured to the extent that the aviators were incapacitated as pilots and sometimes as human beings, as well. Moreover, on numerous occasions, such fractures were so severe as to be fatal. After untold hours of investigation, it has been determined that such vertebral fractures were not due to blunt trauma to the vertebrae, nor to the aviator's body striking the aircraft or the ground. Instead, it has been ascertained that they ostensibly occurred during or slightly after the initial application of vertical (+$G_z$) impact forces on the vertebral column, as the ejection process was taking place.

In the past, many hypotheses have been advanced to explain the vertebral fractures that occurred as a result of an aviator being ejected from his aircraft. Generally speaking, most of the proposed explanations simply concerned peak acceleration values and peak rates of onset of acceleration to which the aviator's spinal column was exposed during ejection. Unfortunately, however, such proposed explanations essentially considered the vertebral column to be a single structure or a series of single structures that have a physical failure point, which when exceeded, caused structural failure of the vertebrae. And because most of the prior art methods and means for preventing vertebral fracture during aviator ejection were predicated upon such hypotheses, they left a great deal to be desired from results standpoints. Accordingly, vertebral fracture rates as high as 56 percent have been experienced during aviator ejection from certain aircraft, even though numerous prior art devices have been used in an attempt to prevent vertebral fracture. Of course, not only high-speed aircraft — such as jet aircraft or the like — have been involved in causing vertebral fractures; crashed in rotary-winged aircraft, automobiles, trains, buses, underwater craft, etc., have, likewise, been instrumental in causing vertebral fractures during impact acceleration conditions, even though they may have included various and sundry safety devices for the prevention thereof.

DESCRIPTION OF THE PRIOR ART

Numerous prior art devices exist at the present time which are used with the intent of preventing or reducing the extent of injuries caused by aviator ejection or other undue body acceleration situations. Although for some practical purposes they may perform quite satisfactorily, for the purpose of providing optimum safety to an aviator while he is being ejected from a high-speed aircraft, they have not nearly achieved the safety results desired, in that they have not ordinarily prevented the vertebral fractures that result from the vertical impact accelerations applied to the spinal column during ejection. For example, such things as seat belts, shoulder straps, and head and neck restrainers have been employed in conjunction with ejector seats, so as to maintain the center of mass of the body within substantially fixed positions relative to the line of thrust of the ejection rocket and/or gun and thereby prevent tumbling or rolling of the seat, as well as preventing the pilot's head and body from impacting on the dash panel. In addition, in an attempt to provide greater safety, the angle that the longitudinal axis of the torso forms with the vertical axis of the seat belt restrained pelvis has been increased by means of increasing the seat angle relative to the line of ejection thrust, the basic theory behind so doing being that the impact vector should be changed so that it does not occur normal to the superior of inferior surface of the vertebral bodies in the thoraco-lumbar region and, thus, reduce or prevent undue stressing thereof. Although perhaps an improvement over using no safety devices at all, all of the known prior art safety devices fall far short of providing the aviator safety needed by, say, our military forces.

SUMMARY OF THE INVENTION

It has been found that the major cause of vertebral fracture during aviator ejection is the dynamic reaction of the vertebral column to the forces and accelerations to which it is subjected in the presence of improper restraint. For instance, there are certain critical movements of the vertebral column under vertical impact acceleration which cause the characteristic fracture of ejections. Therefore, if such movements can be prevented, the fractures cannot occur. Very simply, then, the method and means constituting this invention was devised to prevent said critical spinal movements, and it does it by a unique system incorporating body and head restraints, an inflatable thoraco-lumbar back bag or other spine positioning means, a seat, and a seat ejection means in combination with appropriate actuation and timing devices, which may be either manual or automatic as operational circumstances warrant or as desired by the pilot using them. Accordingly, the subject invention overcomes most of the disadvantages encountered in the prior art, in that it produces new and improved results not obtainable therefrom.

It is, therefore, an object of this invention to provide an improved method and means for preventing vertebral fracture of people, as they are ejected from vehicles or subjected to $+G_z$ accelerations by any other means.

Still another object of this invention is to provide a combination vertebral fracture prevention-pilot ejection system that may be actuated manually or automatically, as operational circumstances so warrant.

A further object of this invention is to provide an improved vertebral fracture prevention system that may be incorporated to an advantage in all vehicles which may, at times, constitute a safety hazard, such as, for example, an aircraft, an automobile, a boat, a ship, an underwater vehicle, a space vehicle, a train, a bus, or the like.

Another specific object of this invention of exceeding importance is to provide a method and means for a pilot to be rapidly ejected from a high speed jet aircraft without fracturing his vertebral column or breaking his back.

Still another object of this invention is to provide an improved system for protecting people from impact acceleration events and crashes of vehicles in which they are disposed.

A further object of this invention is to provide a vertebral fracture prevention system that may be constructed as or within a unitary envelope or capsule which causes minimal decrement to vehicle performance while providing optimum protection to the operator thereof.

Another object of this invention is to provide a vertebral fracture prevention system that is simple, rapid acting, and exceedingly reliable.

Another object of this invention is to provide an improved vertebral fracture prevention system which facilitates the attainment of pelvic restraint and, in addition provides proper posture, comfort, and ease of operation during normal vehicular travel.

Another object of this invention is to provide a vertebral fracture prevention system that incorporates a hyperextension device which, when actuated, cause hyperextension of the vertebral column of the thoraco-lumbar region of a pilot relative to the normal resting posture of a completely restrained individual.

Still another object of this invention is to provide a more comfortable vertebral fracture prevention system which does not unduly interfere with the pilot's operation of the vehicle in which it is installed.

Another object of this invention is to provide an improved method and means for reducing the high rate of vertebral injuries that occur during emergency egress from military aircraft.

Still another object of this invention is to provide an improved method and means for effecting forced postural hyperextension of a human vertebral column, so as to prevent load build-up in the anterior aspects of the vertebral bodies thereof.

Another object of this invention is to provide an improved method and means for reducing human vertebral fractures and other injuries caused by forward flexion of the torso as a result of caudocephalad ($\pm G_z$) accelerations being applied thereto.

Another object of this invention is to provide a vertebral fracture prevention system that is economically and easily manufactured, installed in any appropriate utilization vehicle, maintained, and operated.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

The spinal column portions schematically illustrated in FIGS. 1 through 8 probably have physiological elements that are obvious to the artisan per se; however, because they will be discussed in detail later on in conjunction with the theory of operation of the invention, they will now be described briefly from their structural standpoints and referenced accordingly.

FIGS. 1 through 8 each represent a three interconnected vertebrae section of a human spinal column in various conditions from normal to severely injured — both hypothetically and in fact — in several respects. Because their respective component parts are substantially identical, insofar as it is appropriate to do so, like parts will be referenced by like reference numerals, in order to keep the disclosure thereof as simple as possible. Structurally speaking, they include bony vertebrae 21, 22, and 23, with the adjacent ones thereof connected together by intervertebral discs 24 and 25. As shown, the anterior and posterior sides are on the right and left thereof, respectively.

Figure 1:
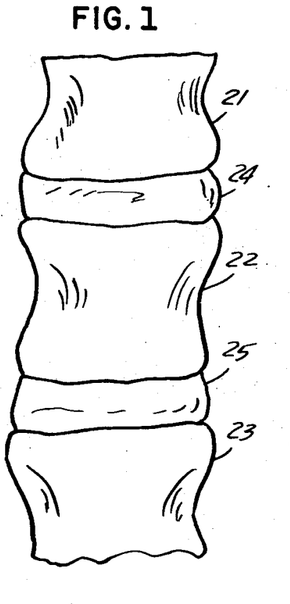
FIG. 1 depicts a schematic representation of a three vertebral section of an erect human spinal column that is normally configured and in healthy condition.
Figure 2:
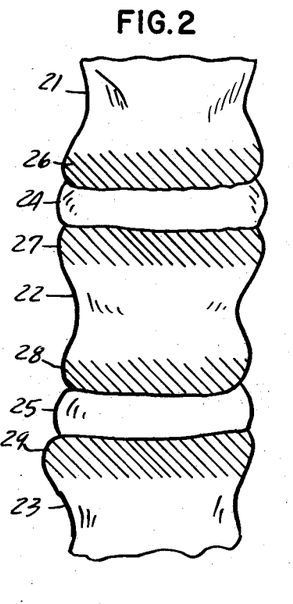
FIG. 2 shows a schematic representation of a three vertebral section of a human spinal column that has been fractured along adjacent surfaces of the adjacent vertebrae thereof.

FIG. 1 depicts a vertebral body in its normal, uninjured condition, while FIG. 2 illustrates vertebrae that have plateau fractures 26 through 29 of vertebrae 21 through 23, respectively, that could have occurred, for example, if an acceleration force was applied to the lower end thereof, as will be discussed more fully subsequently during the explanation of the theory of operation of the invention.

Figure 3:
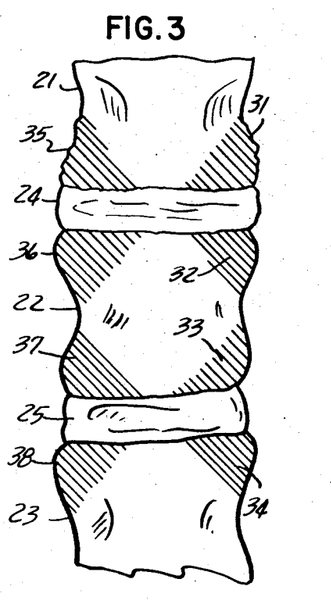
FIG. 3 illustrates a schematic representation of a three vertebral section of a human spinal column that contains anterior and posterior wedge fractures of the adjacent vertebrae thereof.
Figure 4:
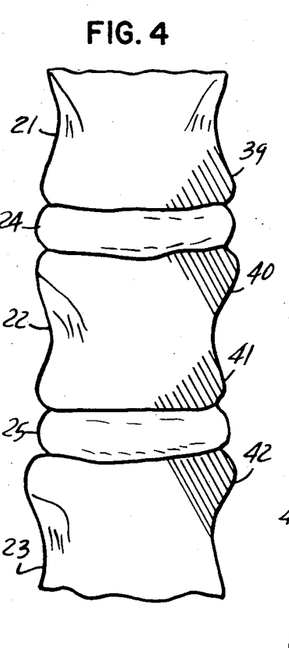
FIG. 4 discloses a schematic representation of a three vertebral section of a spinal column that has anterior compression wedge fractures of the adjacent vertebrae thereof.

FIGS. 3 and 4 likewise show various fractures of the respective bony vertebrae thereof. For instance, the vertebrae of the spinal column section of FIG. 3 have anterior wedge fractures 31 through 34 and posterior wedge fractures 35 through 38, respectively, which could occur as a result of excessive forward and rearward bending of the spinal column, and the vertebrae of the spinal column section of FIG. 4 includes only anterior wedge fractures 39 through 42, which, it has been found, occurs as a result of excessive forward bending of the spinal column.

Figure 6:
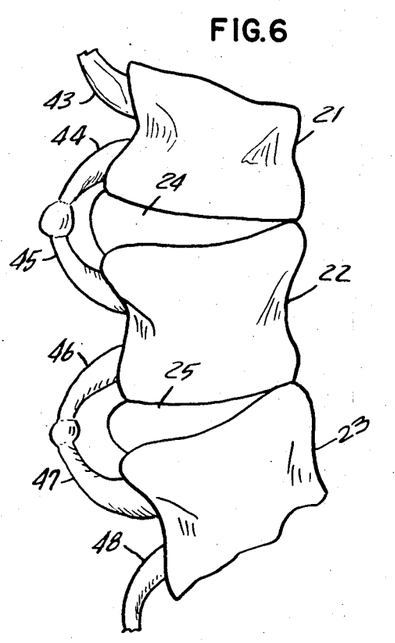
FIG. 6 depicts a schematic representation of a three vertebral section that is bent forward in such manner as it would be bent during pilot ejection from a moving craft.
Figure 7:
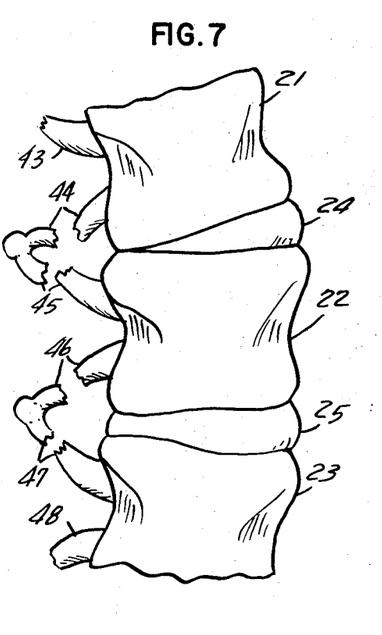
FIG. 7 shows a schematic representation of a three vertebral section of a human spinal column having torn articular facets and ligaments and uncontrolled vertebrae.
Figure 8:
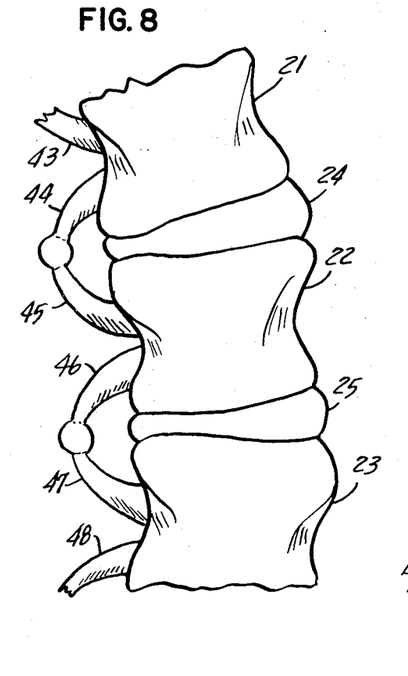
FIG. 8 illustrates a schematic representation of a three vertebral section of a human spinal column having a geometrical configuration which is caused by the subject invention, so as to provide safety therefor during exposure to the excessive forces of acceleration encountered during pilot ejection from a moving craft.

The spinal column section of FIGS. 5 through 8 shows, in addition to the aforesaid vertebral and disc elements, a schematic representation of the ligaments and articular facets which are connected to serve as the posterior hinge joints for adjacent vertebrae, respectively. For convenience, they are herewith referenced as ligaments 43 through 48, with those of FIG. 8 depicted as being torn — a situation that is effected by excessive forward bending of the spinal column.

Figure 9:
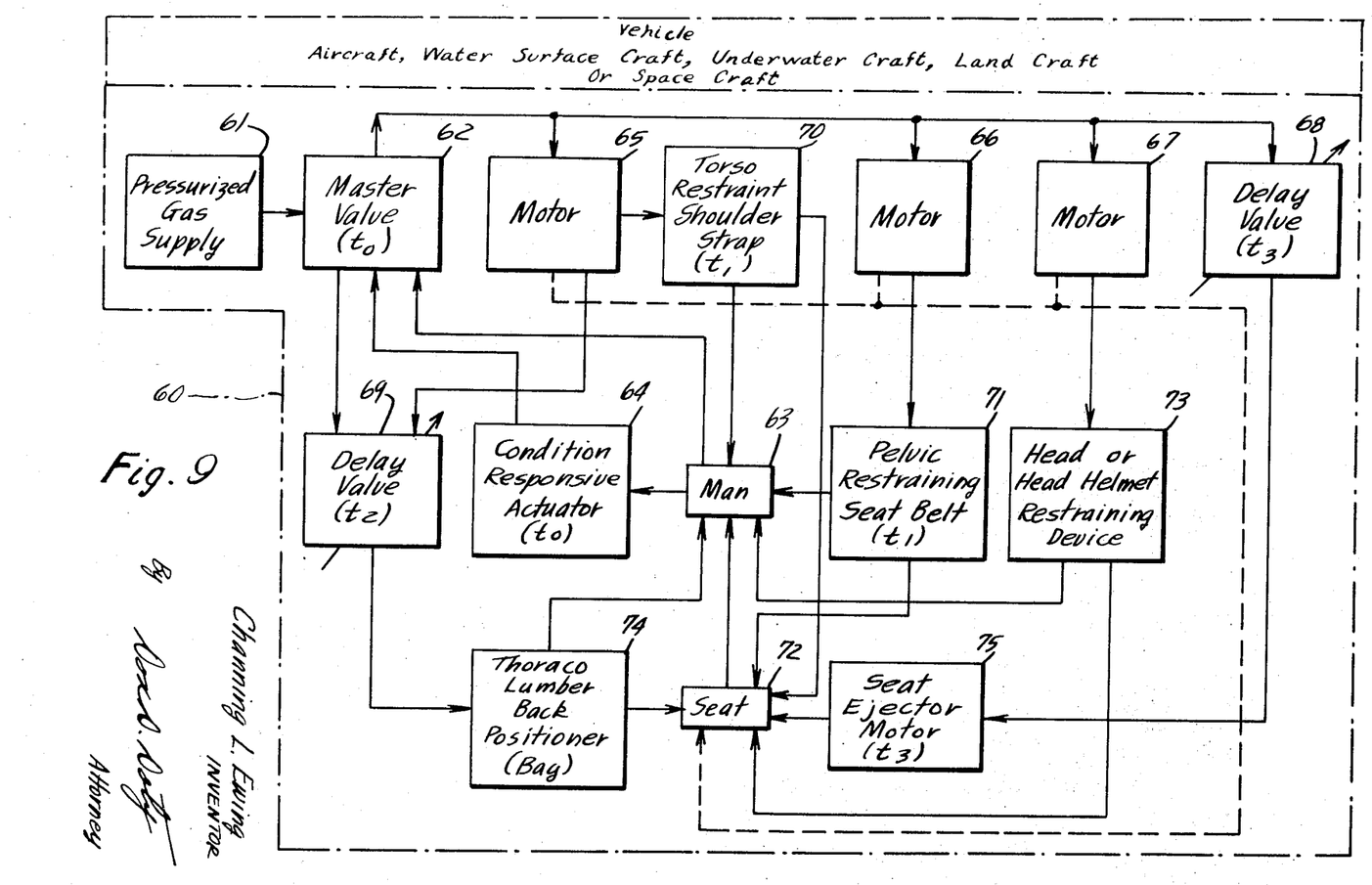
FIG. 9 is a block diagram of a preferred embodiment of the system constituting this invention.

Referring now to FIG. 9, there is shown in preferred embodiment of the system which accomplishes the aforementioned objectives. It will be discussed at this time from the structural concept only, with the functional concept thereof disclosed below, during the explanation of the operation of the entire invention. Thus, the system of FIG. 9 is shown as being disposed in any appropriate vehicle 60 such as, for example, an aircraft, a water surface craft, a submarine boat or other underwater craft, a land craft, a space craft, or the like. Said vehicle 60 includes a pressurized gas supply 61, the gas of which may be of any safe type suitable for safely actuating or powering pneumatic motor devices. The output of pressurized gas supply 61 is connected to the gas input of a master valve 62, which is normally closed until such time as it becomes necessary for the pilot to make an emergency exit from his craft using ejection procedures. At such time, it is either opened directly by means of manual triggering by a man 63 or it is opened indirectly as a result of being triggered manually or automatically by a suitable condition-responsive device 64. In the event it is of the former case, the simple movement of, say, a lever by man 63 will suffice to open master valve 62; in the event it is the latter case, either one of two possible situations may occur. For example, in one instance, man 63 may operate some other device — such as a face mask or curtain — at the time he desires to be ejected from vehicle 60, and the movement of such other device then, in turn, causes master valve 62 to be opened. In another instance, said condition-responsive device 64 may automatically operate in response to such exemplary parameters as preset inertial conditions, angular of linear accelerations or decelerations, or the like, which occur to vehicle 60 or man 63, or both, to effect the opening of master valve 62. In the alternative, it could, by suitable design and combination with other appropriate sensing systems, also be responsive to incipient or actual impact of vehicle 60 during the crash thereof. In addition, if so desired, it may be designed by the artisan to become operative and open valve 62 at a certain time after pilot 63 would under such emergency circumstances ordinarily have manually opened valve 62 himself, but for some reason could not do so, and thereby provide safety to himself, even though he made by incapacitated at the time.

It would obviously be well within the purview of one skilled in the art having the benefit of the teachings presented herein to design condition-responsive actuator 64 in such manner as to facilitate its being operable in response to any parameter that would provide optimum pilot safety during any given operational circumstances for any given vehicle, including a jet aircraft. Accordingly, it may readily be seen that the scope of design of condition responsive actuator 64 is not intended to be limited herein.

The output of master valve 62 is connected to the respective gas inputs of a plurality of gas powered motors 65, 66, and 67, and to the gas inputs of a pair of delay valves 68 and 69. Motors 65, 66, and 67 are, of course, of the types that produce appropriate mechanical movements at the outputs thereof in response to gas under pressure being supplied thereto. Valve 68 is of the type that allows it to remain closed for a preset time and then automatically open, while valve 69 is of the type that remains closed until opened by a mechanical operation being supplied thereto. In the latter case, the output of motor 65 is connected to the control input thereof for such purpose. It is also connected to a torso restraining shoulder strap 70, which is normally disposed around the upper portion of the body of man 63 in such a loose manner as not to restrict the freedom of movement thereof to the extent that it would adversely affect his piloting vehicle 60.

The mechanical output of motor 66 is likewise connected to a pelvic restraining seat belt 71 and effectively connected to a moveable seat 72 in which man 63 is sitting. If so desired, seat belt 71 may optionally incorporate other body member restraining straps or devices, such as, for instance, arm and/or leg restraining elements. Or, in the alternative, such restraining devices may be incorporated as separate individual elements of the subject system and, thus, be actuated by their own motors, respectively. In any event, said seat belt 71 (and the other optional restraining devices) are appropriately connected to or disposed around man 63 and attached to seat 72 for the proper positioning thereof, both during normal vehicle operation and emergency ejection situations, to thereby hold man 63 in a safe attitude and position with respect to seat 72 and vehicle 60 at all times, but especially during emergency pilot ejection situations. Thus, it may be said that effectively there are timely interconnections between the aforesaid elements for reasons that will be explained more fully during the discussion of the operation of the invention.

Similarly, the actuator output of motor 67 is connected to a head or a heat-helmet restraining device 73 for the purpose of effecting the proper, safe positioning thereof during ejection conditions, while leaving the pilot's head sufficient freedom of movement during normal operations to allow him to properly pilot his vehicle.

As previously mentioned, the aforesaid delay valve 69 is of the type which opens after the time the mechanical control signal from motor 65 is applied thereto; but once it is opened, it allows the pressurized gas from supply 61 to pass into and actuate a vertebral positioning device 74 which prevents fracture of spinal vertebrae due to $+G_z$ accelerations, such as, for instance, an inflatable resilient thoraco-lumbar back bag connected thereto to thereby rapidly inflate and expand it at the proper time prior to the occurrence of the actual $+G_z$ or ejection process.

At this point, it should perhaps be emphasized that any suitable vertebral positioning device — be it mechanical, electrical, pneumatic, hydraulic, or otherwise structured and/or actuated — may be used for this purpose. However, in order to simplify this disclosure and still meet the requirements of 35 U.S.C. 112, the embodiment of the subject invention disclosed at this time will be considered as being an inflatable bag referenced specifically as bag 74.

In this particular arrangement, bag 74 is disposed between the front of the back rest of seat 72 and the thoraco-lumbar region of the back of man 63. During its uninflated condition, it is flat and soft; therefore, it is not uncomfortable or annoying and, of course, does not interfere with man 63, as he pilots his vehicle during normal operating conditions. Of course, when inflated, due to its contact with the pilot's thoraco-lumbar region, it produces a certain backward bending spinal column configuration which provides safety thereto, as will be explained in greater detail subsequently.

Delay valve 68 automatically opens a preset time after pressurized gas is supplied thereto, with the actual opening time $t_3$ thereof occurring after the opening time $t_2$ of the aforesaid delay valve 69. The output of delay valve 68 is connected to the gas input of seat ejector motor 75 which, in turn, is connected to seat 72 in such manner as to hold it in place during normal vehicle operation but rapidly eject it and properly restrained man 63 therein and, thus, prevent him from hitting vehicle 60 during emergency ejection conditions.

In this particular preferred embodiment, restraining elements 70, 71, and 73 are shown as being individual components of the system constituting this invention; however, if preferred, they may be interconnected in such manner as would make them have a harness-like configuration, inasmuch as, in essence, that is what they amount to anyway.

At this time, it would perhaps be noteworthy that all of the elements of the subject invention disclosed in block form in FIG. 9 are well known and conventional per se; therefore, it should be understood that it is their unique interconnections, interactions, and dispositions that produce the new and improved results effected thereby. Ostensibly it would be obvious to the artisan, however, that some of said elements of FIG. 9 would have to be properly designed for optimum operation, either individually or in concert. So doing, of course, would be well within the purview of the artisan having the benefit of the teachings presented herewith.

Some design problems, for example, that would have to be taken into consideration of one making and using the invention are the sizing, shaping, and fitting of torso restraint shoulder strap 70, pelvic restraining seat belt 71, helmet or head restraining device 73, seat 72, and resilient thoraco lumbar bag 74. And with respect to the latter, it would have to be made strong enough that it would not burst under the stress imposed on it during ejection operations but still retain some of its resiliency. Moreover, all of the parts thereof would have to be mounted in vehicle 60 and be directly or indirectly connected thereto, respectively, in order to make them function properly per se, as well as to make them function in combination. Furthermore, each of the aforementioned elements referenced as motors 65, 66, and 67, torso restraint shoulder strap 70, pelvic restraining seat belt 71, head or head-helmet restraining device 73, and thoraco lumbar back bag 74 are shown in FIG. 9 as being physically connected to pilot seat 72; however, it should be understood that any particular arrangement or combination thereof may be used without violating the scope of the invention. Therefore, as necessary to implement any preferred embodiment of the invention, any physical interconnection thereof may be optionally employed which would suit any desired purpose and still provide the proper support therefor and the proper interaction thereof.

In addition, although the foregoing embodiment of the invention covers a system for ejecting a safely restrained pilot from the vehicle in which he is riding, it should be understood that, in such instances where actual ejection would not be appropriate, any suitable body restraining and/or positioning device may be substituted for seat ejection motor 75 and/or the combination comprised of seat ejection motor 75 and seat 72. And, moreover, in other instances, delay valve 68 and seat ejector motor 75 need not be used at all and, thus, should be considered as being optional, if operational circumstances so warrant. Of course, many such situations are possible, but for purposes of illustration, one of such situations is herewith mentioned as being an automobile accident where it would probably be dangerous to eject the driver (or a passenger, as the case may be) into the path of other oncoming traffic or into a post, tree, or curb located at or near the side of the road or elsewhere.

Again, the system disclosed in FIG. 9 is not intended to be limiting, as far as structures of the components included therein are concerned. Hence, it should also be understood that although a pneumatic system is depicted therein, an equivalent electrical, mechanical, hydraulic, or other system may be substituted therefor. So doing would merely involve designing the components incorporated therein in such manner as to make them compatible with each other, the person being protected, and the vehicle or other device within which they are included. Again, the making and using of such designs would not violate the spirit and scope of this invention, inasmuch as they would be obvious to an artisan having the benefit of the teachings presented herewith.

Figures 10, 11:
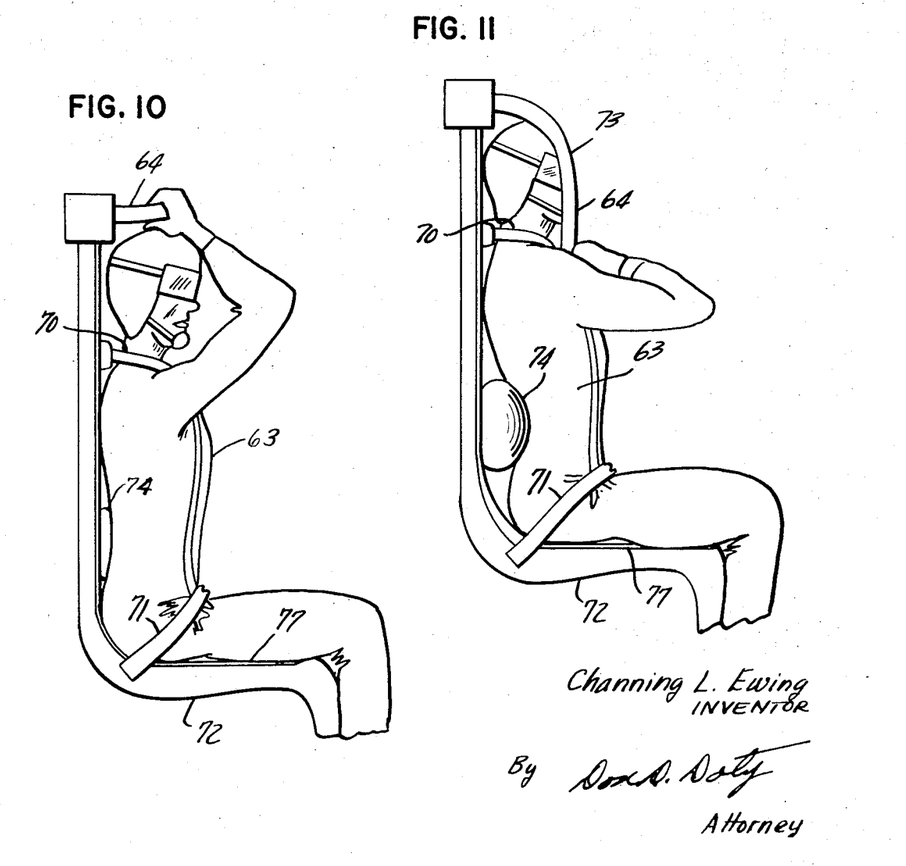
FIG. 10 is a schematic representation of a man being restrained in his pilot's seat immediately prior to inflation of the thoraco-lumbar back bag of FIG. 9.
FIG. 11 shows by means of schematic representation the position a pilot's spinal column acquires as a result of inflating the thoraco-lumbar back bag of FIG. 9.

FIGS. 10 and 11 schematically depict the disposition of the pilot with respect to the space within which he is effectively encapsulated at the time he decides to eject and at the time immediately prior to his being ejected, respectively. For the purpose of conveniently referring to the structures thereof, like elements will be referenced by like numerals which, in turn, are the same as those used to reference like elements of FIG. 9. Accordingly, each thereof discloses such elements as man 63, condition responsive actuator 64, torso restraint shoulder strap 70, pelvic restraining seat belt 71, seat 72, head restraining device 73, and resilient thoraco lumbar back bag 74, the latter of which is shown in its deflated condition of FIG. 10 and in its inflated condition in FIG. 11. In addition, if so desired, seat 72 may include a movable pan 77 which will slide to the rear at the time pilot restrainment occurs immediately prior to ejection.

The deflated condition of bag 74 is merely illustrated to show the position thereof with respect to seat 72 and man 63 during normal vehicle operations and to disclose that such position thereof does not interfere with man 63 while he is piloting or riding in vehicle 60. On the other hand, the inflated condition of bag 74 is shown in FIG. 11 to disclose how it causes and maintains an arcuate posterior curvature in the spinal column of man 63 while man 63 is being ejected from vehicle 60 and to insure that it is understood that it is an exceedingly important aspect of the system constituting this invention.

Figure 12:
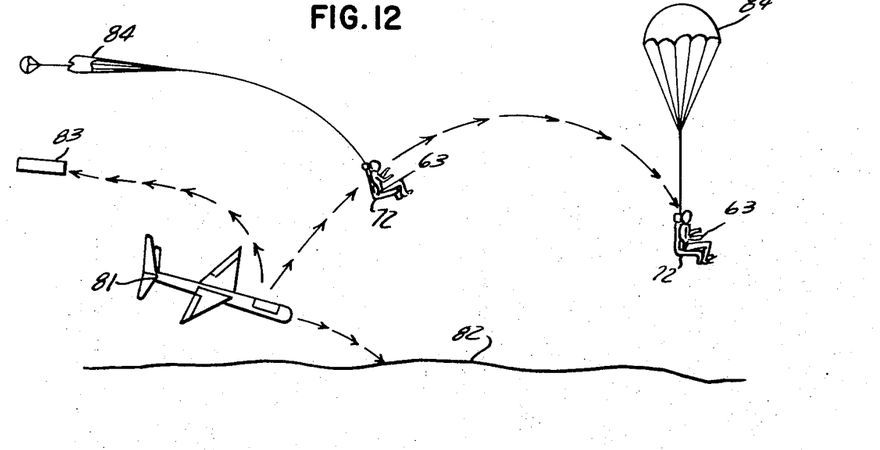
FIG. 12 is a quasi-pictorial representation of a typical situation where the subject invention may be used to an advantage.

FIG. 12 merely illustrates a simple exemplary emergency situation in which the subject invention may be used to an advantage. As shown, craft 81 is about to crash into earth 82. Canopy 83 has been removed, and pilot 63 has been ejected. Of course, shortly after ejection, a parachute 84 opens to let pilot 63 float safely to earth 82 at some location away from crashed aircraft 81.

Again, to insure clarity, it appears to be noteworthy that although the preferred embodiment disclosed herein constitutes a unique method and means for a pilot to safely eject from a jet aircraft, the invention should not be limited thereto, in that it may, with proper design, be installed in many other vehicles, such as water surface craft, underwater craft, land craft, space craft, and the like, or any combination thereof. Hence, craft 81 could, for instance, be of the type that both flies in the air and in space. In addition, it could be an amphibious type craft that flies in the air and travels on or under water, the latter of which is relatively new but not unknown in the art. It should, therefore, be understood that craft 81 of FIG. 12 may be considered as being about to crash into the land of earth 82 or into sea thereof; or in the alternative, it may be considered to be about to make the transition from being an aircraft to a subaqueous type craft, and, thus, the pilot thereof has ejected himself therefrom for any reason warranted by the situation.

THEORY OF OPERATION

While the theory of operation of the subject invention is similar for human protection from any $+G_z$ impact acceleration generated from practically all vehicles, for the purpose of keeping this disclosure as simple and brief as possible, only the theory of operation thereof with respect to the rapid ejection of pilots from disabled rapidly-moving aircraft will be herewith explained.

Figure 5:
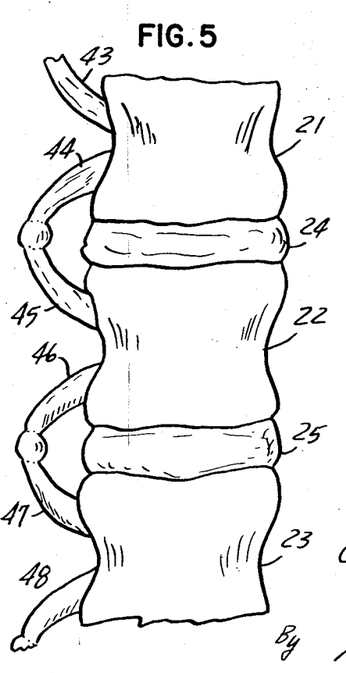
FIG. 5 discloses a schematic representation of a three vertebral section of a human spinal column that is normal with respect to the disposition of the vertebrae, the discs located therebetween, and the respective interconnecting interarticular facets and ligaments thereof.

The abovementioned proposition to the effect that certain critical movements of the vertebral columns of pilots during vertical impact accelerations effect fractures may be explained by considering the thoracolumbar vertical column as a series of spring-mass systems, with the inter vertebral discs serving as springs, the vertebral bodies (and body segments which they support) as individual masses, and the interspinous ligaments as spring limiters, as illustrated in FIGS. 1 and 5. Thus, if the vertebral bodies and intervertebral discs act as a simple spring-mass system, an input impact acceleration applied normal to the vertebral body superior or inferior surface and through the center of mass of the vertebrae should result in plateau fractures in the respective vertebrae, as noted in FIG. 2. And if such an input acceleration is applied at a point either in front or back of the center of mass, anterior or posterior wedge wedge fractures should respectively result, due to anterior or posterior bending of the vertebral column as illustrated in FIG. 3. However, it has been determined from examination of several hundred spinal column fracture cases that the majority are anterior wedge-shaped compression fractures, wherein only the corners of the anterior bony portions of the adjacent vertebrae are fractured, as illustrated in FIG. 4. One possible explanation of this fracture phenomena is that the posterior compression of the system is limited while the anterior compression is not and, hence, due to the acceleration forces on the bottom end of the spinal column, the spinal column can only bend in the forward direction. Anatomically this may readily be seen because the center of mass of the human torso is in front of the vertebral column and, thus, the candocephaled acceleration load transmitted to the thoracic spine through the ribs is eccentric, thereby resulting in the extreme forward bending of the spine. Furthermore, the articular facets and the connecting ligaments posterior to the vertebral body act as mechanical spring limiters which prevent rearward flexion of the spine. Thus, a second spring limiter system (namely the articular facets and their connecting ligaments) is in action.

The posterior "compression limiter" (or "spring limiter") is seen to be the articular facets of the vertebrae. As shown in FIG. 5, they are held together by ligaments which serve as posterior hinge joints for adjacent vertebrae. As may be seen in FIG. 6, such hinge joints allow adjacent vertebral lips to touch but (unless an inordinate amount of force is applied thereto) they tend to prevent any contact of adjacent posterior vertebrae lips.

It was then theorized that if the vertebral column could be restrained during the application of impact accelerations in a position of hyperextension similar to that depicted in FIG. 7, in order for a vertebral fractures to occur, the spinous process connecting the articular facets to the vertebral body would have to be fractured and/or the ligaments which bind the articular facets together would have to be torn, as shown in FIG. 7. But the forces required to cause such fractures of the spinous processes would have to be so great that they would cause disruption of the major blood vessels or organs prior to causing the bony fractures.

Hence, it may be seen that from this theoretical discussion that if the vertebrae in the thoraco-lumbar region of the back of a pilot are properly restrained with a backward bending configuration such that during the application of vertical acceleration forces it is not allowed to bend in the forward direction sufficiently to allow the front edges of adjacent vertebrae come into forceful contact or to allow the tearing of the posterior ligaments thereof, then substantially no injury to the spine thereof will occur. Fortunately, indeed, it has been found by examination of numerous cadavers that spinal injuries occur to ejected pilots for the reasons theoretically obtained and, even more important, that they could, in fact, be prevented or at least materially reduced by using the aforementioned theoretical remedy. Thus, by exhaustive testing, it has been determined that by means of the simple expedient of this invention many lives can be saved, many pilots can continue their profession, and much money will be saved, even though such pilots may have to eject from their crafts during emergency situations. Obviously, the subject invention accordingly constitutes a most wonderful advance in the art and, thus, is of important patentable significance, both theoretically and practically speaking, but especially from the structural and functional standpoints to be described now.

MODE OF OPERATION

To some extent, the functions of some of the components incorporated in the subject invention were explained above, in order to more adequately define each thereof or, perhaps, to better define the certain structural and operational interactions occurring therebetween. Nevertheless, in order to thoroughly disclose the invention as an overall system, the operation thereof — especially taking into consideration the various concerted functions and the respective timing thereof — will now be discussed briefly in conjunction with those figures of the drawing pertinent thereto.

Once pilot 63 has decided that his aircraft is going to crash (or is otherwise in great peril) and that he must eject therefrom (see FIG. 12) if he is going to save himself, he ordinarily takes the initial action of triggering a particular chain of events. By means of a direct trigger signal — such as pulling a lever, or pushing a button, or the like — master valve 62 is opened at time $t_0$. Or in the alternative, the initial action he takes is the pulling of a curtain — which constitutes condition responsive actuator 64 in this case — down over his face, as shown in FIG. 11. Because so doing likewise causes master valve 62 to be opened at the same time, it may, for all practical purposes, be said that such two events occur simultaneously at time $t_0$.

Opening valve 62 allows gas under pressure from supply 61 to power motors 65, 66, and 67, which, in turn, at time $t_1$, tighten torso restraint shoulder strap 70, tighten pelvic restraining seat belt 71 (and limb restraint harness, too, if used), and tighten head restraining device 73 (if other than the aforesaid face curtain) about man 63 and, thus, in effect, encapsulate him firmly in a harness-like arrangement within seat 72. Hence, most of the avitator's body is held firmly against the seat pan and back of seat 72 in a position that is optimum for undergoing $+G_z$ impact acceleration and, in addition, in such a position that the center of mass thereof is disposed in a predictable location relative to the line of thrust of the seat ejection mechanism and/or motor 75. Moreover, it is so restrained that structural protection can be provided for that space or capsule volume which it occupies. This body restraining process is complete only when the torso portion of the pilot's body is compressed tightly against deflated bag 74 and the rigid back of seat 72, the back of which is preferably molded for an optimum complementary fit therewith.

At the time master valve 62 is opened, delay valve 69 is caused to be actuated, and after a preset time $t_2$, it is opened to the extent that pressurized gas fills thoraco lumbar back bag 74, thereby increasing its volume. In its deflated condition, prior to being filled by gas at time $t_2$, it has the deflated appearance shown in FIG. 10; but, after being filled with gas, it acquires the expanded, increased volume configuration shown in FIG. 11. In some instances, the delay aspect in filling bag 74 may not be absolutely necessary; however, it has been found to be desirable in most practical instances, because it allows the torso of the pilot to be compressed tightly against the rigid back of seat 72 before hyperextension thereof begins.

At this time, it might be useful to refer back to FIGS. 4 though 8, in order to understand exactly what is taking place in the thoraco-lumbar region of the pilot's spinal column immediately prior to, during, and immediately after the inflation of bag 74. As previously suggested, anterior wedge fractures of the adjacent edges 39 through 42 of vertebrae 21 through 23, respectively shown in FIG. 4, are ordinarily the type which cause incapacitation or death of the pilot during or shortly after the occurrence of the ejection process. This apparently occurs because his spine is excessively bent forward by the forces of acceleration while at the same time posterior bending movement thereof is limited by articular facets and then connecting ligaments 43 through 48. As shown in FIG. 5, immediately prior to ejection, vertebrae 21, 22, and 23 are properly and safely disposed, with discs 24 and 25 both separating and holding them in their normal places. Furthermore, the articular facets and their connecting ligaments 43 through 48 are likewise normally disposed and properly act as posterior hinge joints and spring limiters. But if the forces of acceleration are great enough and if they are applied to the lower end of the spine, anterior bending thereof occurs as shown in FIG. 6, at which time several adverse things usually occur: (1) the forward corners of adjacent vertebrae impact upon each other and fracture (as in FIG. 4), and (2) if the force is great enough, articular facets and their connecting ligaments may become torn, as illustrated in FIG. 7. As shown in FIG. 7, vertebrae 21 through 23 are then no longer hinged by articular facets and their connecting ligaments 43 through 48, thereby allowing them to wobble in any direction without restraint and possibly damaging the spinal cord, depending on the maneuvering of the ejected capsule. But, of course, by then, the pilot is helpless, unconscious, or dead, and the ejection thereof will have been wasted effort from any practical standpoint. Consequently, such deleterious occurrences are something to be avoided at all costs, because human life, in fact, is at stake and — of lesser importance but nevertheless important — because a highly skilled, expensively trained pilot is forever lost to the military and/or civilian flying corps needing his services.

On the other hand, if bag 74 is timely inflated as shown in FIG. 11 to effect an arcuate posterior spinal column postural configuration substantially similar to that shown in FIG. 8 during pilot ejection, the anterior edges of the adjacent vertebrae thereof are not broken because they never meet, nor are the ligaments attached thereto torn or sprained because they are never stretched beyond their elastic limits. These very desirable results are, of course, effected because the vertebrae are firmly held in such manner by the pressure of the inflated bag and its associated harness on the posterior spinous processes of the vertebrae that deleterious forward bending thereof cannot occur under normal ejection conditions.

From the foregoing, it may readily be seen that a person being ejected from a moving vehicle is restrained in an optimal postural position, so that he is capable of withstanding impact acceleration forces with would otherwise cause serious or fatal injury, while at the same time, being positioned in a space envelope that has a predictable location and provides maximum protection with minimum decrement to vehicle performance.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for preventing the fracture of spinal column vertebrae of a person exposed to dangerous forces of acceleration while located within a vehicle, comprising in combination:

means for firmly securing said person in a predetermined restrained postural position within an envelope-like confinement means located within said vehicle in response to a predetermined actuation signal;

means disposed against the thoraco-lumbar region of the spinal column of said person for timely effecting a predetermined posterior arcuate curvature thereof in programmed response to the aforesaid predetermined actuation signal and immediately after said person is firmly secured within said predetermined envelope-like confinement means, said means including a resilient bag capable of being inflated and expanded by a pressurized gas, and means connected to said resilient bag for timely supplying said gas thereto in response to said predetermined actuation signal; and means effectively connected to said predetermined envelope-like confinement means for effecting a predetermined disposition thereof and the person firmly secured therein with respect to said vehicle in timely response to said predetermined actuation signal.

2. The system of claim 1, wherein said vehicle is an aircraft.

3. The system of claim 1, wherein said vehicle is a space craft.

4. The system of claim 1, wherein said vehicle is an underwater craft.

5. The system of claim 1, wherein said vehicle is a water surface craft.

6. The system of claim 1 wherein said vehicle is a land vehicle.

7. The system of claim 1, wherein said means effectively connected to said predetermined envelope-like confinement means for effecting a predetermined disposition thereof and the person firmly secured therein with respect to said vehicle in timely response to said predetermined actuation signal comprises:

a pressurized gas supply means;

a valve means connected to the output of said pressurized gas supply means for timely allowing the pressurized gas therefrom to pass therethrough in response to the aforesaid predetermined actuation signal; and motor means connected between the output of said valve means and the aforesaid predetermined envelope-like confinement means for effecting said predetermined disposition thereof with respect to said vehicle in response to the pressurized gas received from said valve means.

8. The system of claim 1, wherein said means for firmly securing said person in a predetermined restrained postural position within an envelope-like confinement means located within said vehicle in response to a predetermined actuation signal comprises:

a seat in which said person sits during the piloting of said vehicle;

harness-like means effectively connected to said seat and disposed about the body of said person as he sits therein;

a pressurized gas supply means;

motor means connected to said harness-like means for the drawing thereof about said person in such manner that he is firmly restrained within said seat; and valve means connected between the output of said pressurized gas supply means and the inputs of said motor means for supplying pressurized gas thereto for the energization thereof in response to the aforesaid predetermined actuation signal.

9. The invention of claim 8, further characterized by a condition responsive actuator means connected to said valve means for the opening thereof in response to a predetermined parameter sensed thereby.

10. A system for preventing the fracture of spinal column vertebrae of a person during the emergency ejection thereof from an otherwise dangerously situated vehicle, comprising in combination:
 means for firmly securing said person in a predetermined restrained postural position within an envelope-like confinement means located within said vehicle in response to a predetermined ejection signal;
 means disposed against the thoraco-lumbar region of the spinal column of said person for timely effecting a predetermined posterior arcuate curvature thereof in programmed response to the aforesaid predetermined ejection signal and immediately after said person is firmly secured within said predetermined envelope-like confinement means, said means including a resilient bag capable of being inflated and expanded by a pressurized gas, and means connected to said resilient bag for timely supplying said gas thereto in response to said predetermined ejection signal; and
 means effectively connected to said predetermined envelope-like confinement means for effecting the ejection thereof and the person firmly secured therein from said vehicle in timely response to said predetermined ejection signal.

11. The system of claim 10, wherein said vehicle comprises an aircraft.

12. The system of claim 10, wherein said vehicle comprises a space craft.

13. The system of claim 10, wherein said vehicle comprise a marine vehicle.

14. The system of claim 10, wherein said vehicle comprises a land vehicle.

15. A system for preventing wedge fracture of the anterior edges of adjacent vertebrae of the spinal column of a pilot during the emergency ejection thereof from a movable craft, comprising in combination:
 a pressurized gas supply;
 a normally closed master valve, adapter for being opened by a predetermined signal, connected to the output of said pressurized gas supply;
 a first gas powered motor having a gas input, a mechanical power movement output, and a control output, with the gas input thereof connected to the output of said normally closed master valve;
 a first normally closed delay valve having a gas input, a control input for effecting the opening thereof, and a gas output, with the gas input thereof connected to the gas output of said master valve, and with the control input thereof connected to the control output of the aforesaid first gas powered motor;
 a seat having a bearing-mounted movable bottom pan, an automatically actuated back in the fully retracted position which may be unlocked for normal use, and a rigid back;
 a pilot sitting within said seat in such manner as to be in contact with said bottom pan and rigid back;
 a torso restraint shoulder strap connected to the output of said first gas powered motor, effectively connected to said seat, and disposed around said pilot;
 a second gas powered motor having a gas input and a mechanical power movement output, with the gas input thereof connected to the output of said master valve;
 a pelvic restraining seatbelt connected to the mechanical power movement output of said second gas powered motor, effectively connected to said seat, and disposed around the pelvic region of said pilot;
 a third gas powered motor having a gas input and a mechanical power movement output, with the gas input thereof connected to the gas output of the aforesaid master valve;
 a head restraining means connected to the mechanical power output of said third motor, effectively connected to said seat, and mounted on the head of said pilot;
 a second normally closed delay valve, having a gas input and a gas output, the opening of which is automatic but delayed for such preset period of time that it remains closed until after the aforesaid first normally closed delay valve is opened;
 a seat ejector motor connected between the gas output of said second normally closed delay valve and the aforesaid seat; and
 an inflatable resilient bag, having a gas input connected to the gas output of the aforesaid first normally closed delay valve, disposed between the thoraco-lumbar region of the back of said pilot and the front of the rigid back of the aforesaid seat.

16. The system of claim 15, wherein said movable craft comprises a jet aircraft.

17. The system of claim 15, wherein said movable craft comprises a space craft.

18. The system of claim 15, wherein said movable craft comprises a submarine vehicle.

19. The system of claim 15, wherein said movable craft is a land craft.

20. A method of preventing the fracture of signal column vertebrae of a person sitting in and leaning against the back of a seat disposed within a vehicle during the emergency ejection thereof from said vehicle, comprising the steps of:
 firmly restraining said person in a safe postural position within and against the back of the seat disposed within said vehicle in response to a predetermined ejection signal;
 forcefully bending the spinal column of said person in such manner that it has a backward arcuate curvature at the thoraco-lumbar region thereof while said person is being firmly restrained in a safe postural position within said seat and against the back thereof, said step being implemented by inflating a resilient bag in such manner against the back of said person that the spinal column thereof assumes the aforesaid backward arcuate curvature; and
 timely ejecting said seat and the person restrained therein from said vehicle while the spinal column of said person is being forcefully bent to have a backward curvature at the thoraco-lumbar region thereof.

* * * * *